Patented Sept. 16, 1941

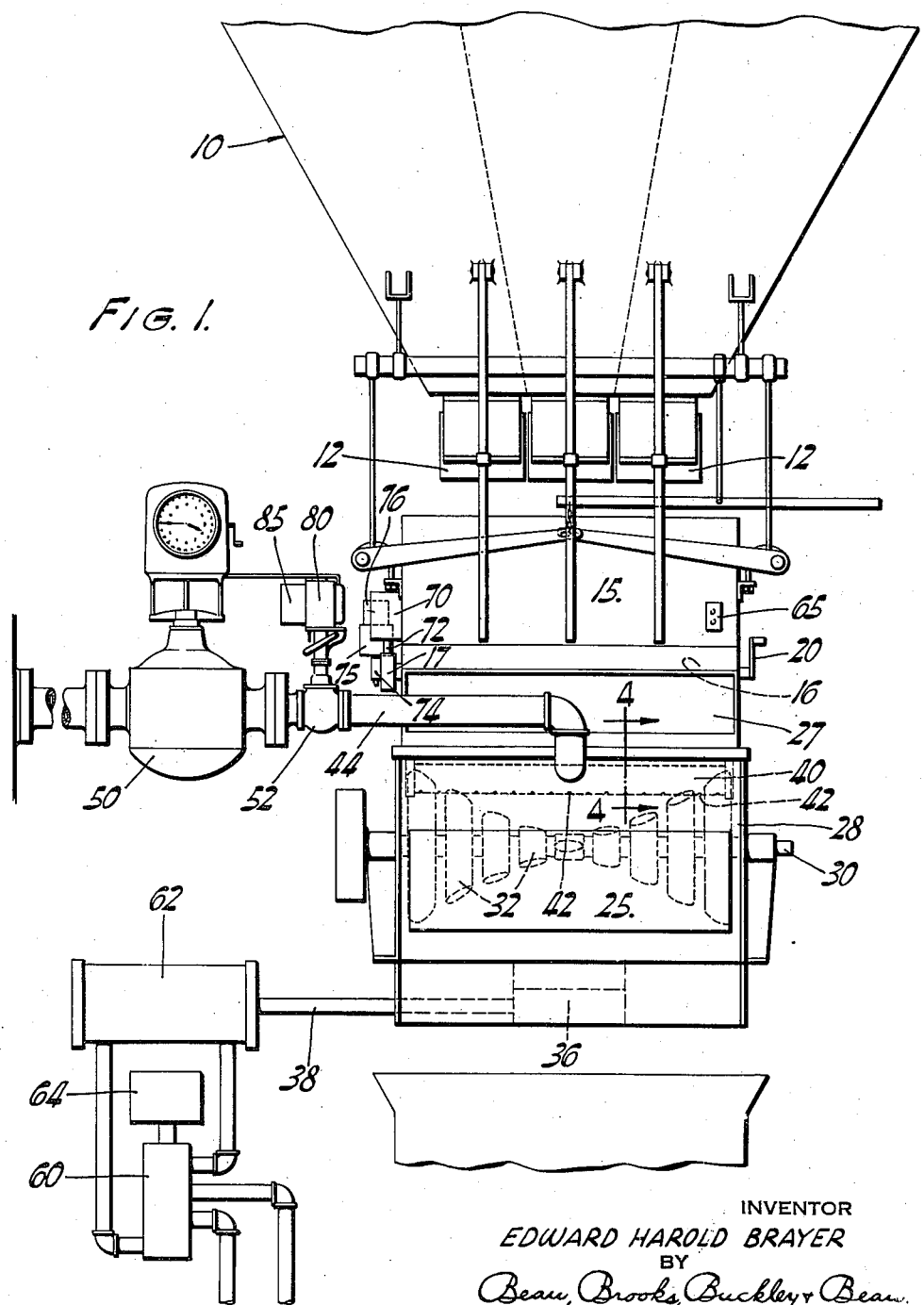

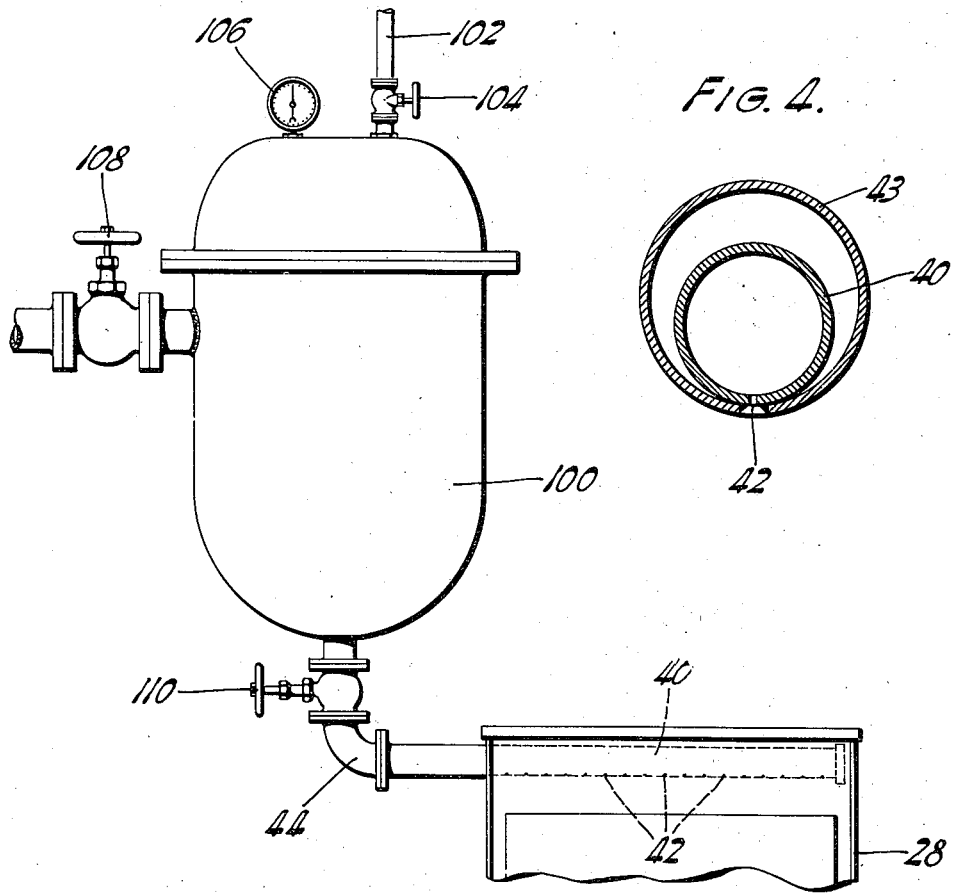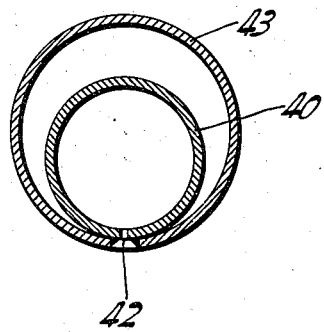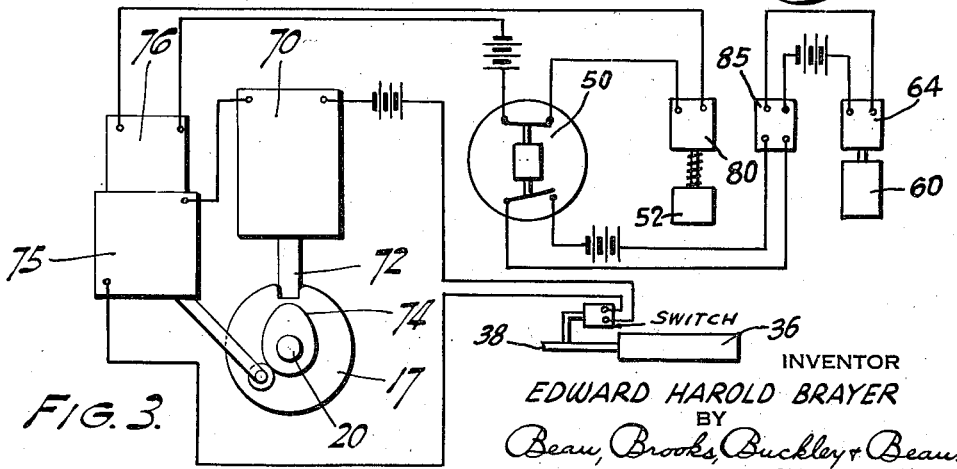

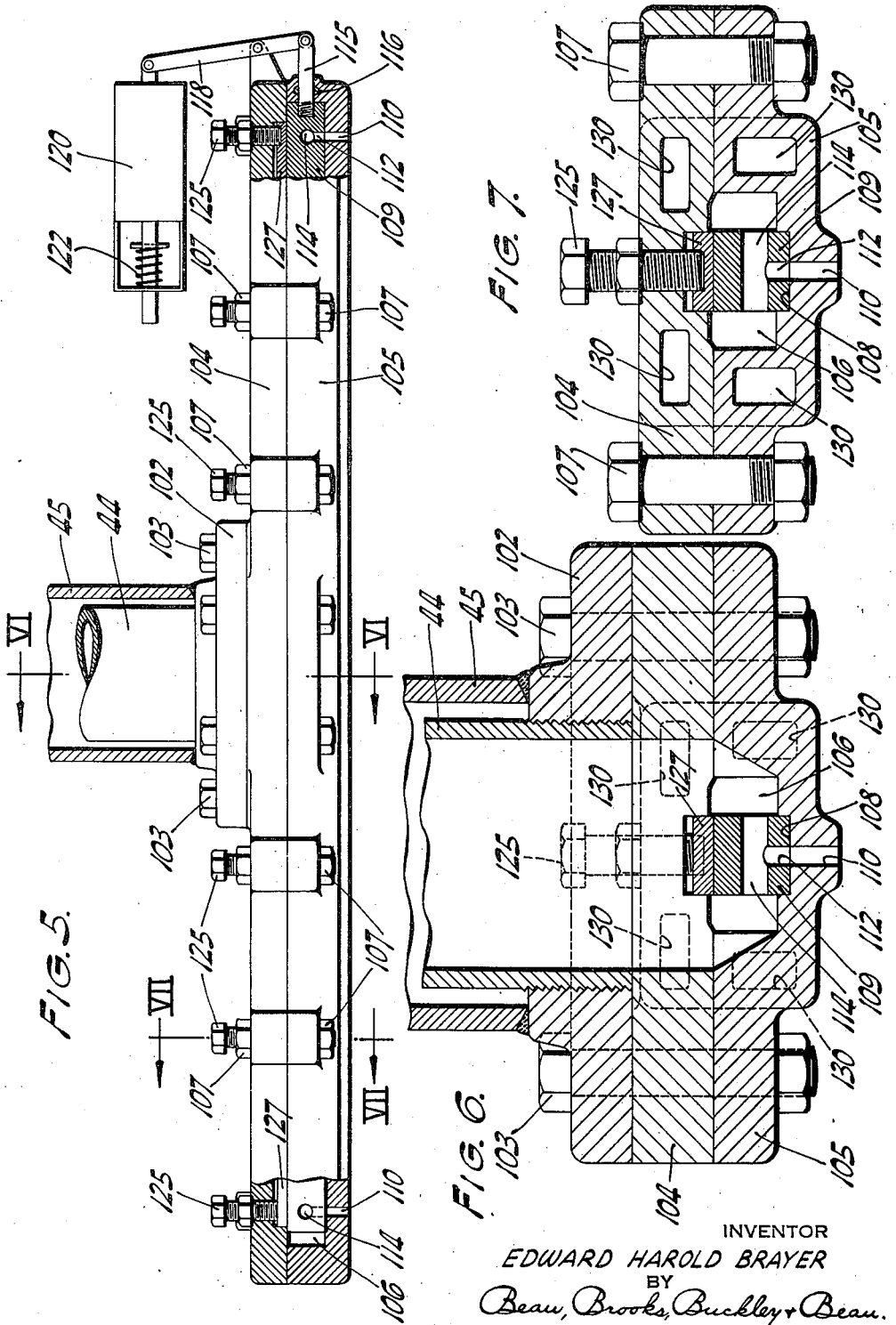

2,256,422

UNITED STATES PATENT OFFICE 2,256,422

BITUMINOUS PAVING COMPOSITION MIXING APPARATUS

Edward Harold Brayer, Buffalo, N. Y.

Application December 21, 1939, Serial No. 310,277

5 Claims. (Cl. 259—163)

This invention relates to an improved method and means for mixing substances of various physical characteristics in accurately controlled proportions and into intimately mixed form; and has particular application to an improved method and means for mixing the solid and fluid ingredients of bituminous paving compositions, or the like.

In connection with the use of prior types of apparatus for mixing fluid and solid ingredients into composition of prescribed specifications, considerable difficulty has been experienced in arriving uniformly and accurately at the desired results. For example, in connection with prior systems involving batch weighing of the fluid ingredients prior to introduction into a mixing device, the varying viscosity characteristics of the fluid under changing temperature conditions has introduced a particularly troublesome problem. Complicated heat-regulating means such as steam jackets or the like have sometimes been arranged about the weighing mechanism and the inlet and outlet conduits of such devices, but such means have proved to be no more than partially effective for the purpose intended because of difficulties associated with control of the heating medium and of the other variable factors influencing the fluid flow. Also, the condensate accumulations in steam jacket devices associated with the weighing hoppers introduce weighing errors as a result of which the mixed product does not meet specifications.

Mixing methods employing fluid ingredient measurement by weighing processes are inherently unsuited to handle materials of different specific gravity characteristics, such as bituminous fluid substances. In the case of asphalts, for instance, the specific gravities thereof vary sometimes as much as 15%, depending upon the locality from which it is obtained. Consequently, in order to compensate for such differences continual adjustments to the weighing apparatus and close attention thereto by the operator must be maintained; and in the case of many present day asphalt paving operations viscosity and/or specific gravity characteristics of the asphalt delivered to the mixing plant vary so continuously and to such degrees as to make accurate mixing of the composition to the required specifications most difficult and impractical. Consequently, the composition of the finished product is usually contrary to the specifications, and in many cases of greater cost to the contractor than is required because of unnecessarily increased proportions of the relatively expensive ingredients.

Another disadvantage attendant the use of prior forms of mixing apparatus of this type is that insufficient provision is made therein for complete and intimate mixing of the bitumen fluid with the dry ingredients by reason of the fact that the fluid ingredients are viscous and are usually dumped into the mixing device in batch form. Hence the uniformity of the finished product depends solely upon the ability of the mixer to stir the ingredients into a homogeneous mass. In many cases where the fluid ingredients are of highly viscous form it is practically impossible under such conditions for the mixing operation to provide a truly uniform and homogeneous product; and in order to provide a product that is passable for the purposes intended the mixing operation will necessarily be expensive from the standpoint of the time involved.

The primary object of the present invention is to provide a method and apparatus of improved form for mixing ingredients of the type specified in an improved manner and to avoid the objections and disadvantages of the prior art methods and devices as set forth hereinabove. Another object of the invention is to provide an apparatus of the type specified that may be used with increased safety to the operator thereof from accidental combustion and/or splashing of the heated bitumen materials being handled. Other objects and advantages of the invention will be apparent from the specification herein which is by way of an example of an embodiment of the principles thereof.

In the drawings:

Fig. 1 is a fragmentary elevation of an apparatus employing the features of the invention;

Fig. 2 is a fragmentary view of a modified form of a portion of the apparatus;

Fig. 3 is a view of a detail of the control system of the apparatus, in conjunction with a wiring diagram therefor;

Fig. 4 is a section through the spray bar of the apparatus along line IV—IV of Fig. 1;

Fig. 5 is a side elevation of a modified form of an element of the apparatus;

Fig. 6 is a section along line VI—VI of Fig. 5; and

Fig. 7 is a section along line VII—VII of Fig. 5.

As illustrated in the drawings, an apparatus incorporating the features of the invention includes generally a dry aggregate storage bin 10 which is partitioned to provide separate storage spaces for different dry aggregate ingredients of the paving compositions to be mixed. For example, the bin may be arranged to store crushed stone, sand, and pulverized mineral filler, or the like, according to the specifications to which the mix will be made. The storage bin is provided with gravity discharge openings provided with manually operable gates 12 under each of the bin sections. A weighing hopper 15 is suspended below the bin 10 by means of any suitable type of scale mechanism, whereby the weight of material dropped into the weighing hopper will be indicated on the dial of the scale mechanism. The weighing hopper 15 is provided with a gravity discharge bottom opening which is normally closed by a gate 16 manually controllable by a lever 20, the discharge opening being so arranged as to direct the weighed aggregate into a mixer 25 disposed therebelow. The connection between the hopper 15 and the mixer is entirely closed by means of a metal skirt 27 extending from the lower end of the hopper into connected relation with the side walls of the mixer casing.

The mixer 25 comprises a box-like casing 28 and a pair of shafts 30 rotatably mounted upon end wall portions thereof and arranged to extend through the interior of the mixer in substantially parallel relation and spaced from the side walls thereof. The shafts 30 carry rigidly extending mixing blades 32 and are caused to be continuously rotated by any suitable means, such as an electric motor through a belt, chain, or gear drive device (not shown). The mixer casing 28 is provided with a lower discharge opening and a gate 36 for the control thereof, the gate being arranged to be operated to opened and/or closed positions by means of any suitable mechanical device such as a steam operated piston rod 38, as shown.

Means for introducing the bituminous ingredient of the composition are provided in the form of a spray bar 40 extending lengthwise of the mixing chamber 28 and disposed in the upper portion thereof centrally of the mixer shafts 30 and provided with spaced jet openings 42 for outlet of fluid bituminous material in finely divided and sprayed form over the area of the contents of the mixing chamber. The spray bar 40 is connected to a conduit 44 leading from a positive displacement type fluid meter 50 which in turn is fed by means of a conduit from a source of fluid supply under a substantial pressure. The flow of fluid through the meter and the fluid line to the spray bar is controlled by means of a valve 52 which opens automatically at the end of a predetermined dry mixing time cycle and permits delivery of a stream of fluid equal in volume to a preselected amount, upon delivery of which the meter automatically causes the valve 52 to close. For this purpose controlling meter mechanism of the type previously patented by me in patents numbered 2,116,777 and 2,116,778 may be employed; or in lieu thereof any other suitable form of automatically operating positive displacement volumetric control device in which the mechanism is set to deliver a definite quantity of liquid by volumetric measurement, after which the mechanism automatically stops the flow and resets itself to its original condition.

A valve 60 is provided in the steam line for operation of the piston rod 38, and the core of the valve is arranged to be shifted to opposite positions providing for passage of steam into the cylinder 62 at alternate sides of the piston by means of an electromagnetic coil 64 connected in series with a suitable electric current source and a control switch 65. The control system is so arranged that when the operator closes the control switch 65 the core of the valve 60 is actuated to allow passage of steam into the cylinder 62 in such manner as to force the mixer gate 36 to its closed position. Simultaneously, a lever on the gate 36 closes a switch to energize a solenoid 70 (Fig. 3) in the control switch circuit which withdraws a latch 72 normally locking the shaft 17 of the gate 16 of the weigh box in its closed position. Consequently, the operator is now able to manually operate the gate 16 by means of the lever 20 and to dump a previously weighed load of dry aggregate into the mixer 25. As the gate 16 is opened a cam 74 on the shaft 17 opens a switch 75 in the circuit of the solenoid 70, thus de-energizing the latter and permitting the latch 72 to drop by gravity against the shaft 17 for subsequent locking thereof when it is returned to gate closed position. The operator then closes the weigh box gate 16 by means of the lever and starts to weigh out the next batch of dry aggregate materials.

The switch lever 75 is associated with the weigh box gate 16 and is arranged in such manner that when the gate 16 is subsequently closed the cam controlled member thereof returns to circuit closed position and closes a circuit starting a time switch 76. The timer 76 may be any suitable type of time-controlled switch device such as are presently supplied to the market by several manufacturers, and is adjusted to operate at the expiration of a predetermined time lapse to close a circuit energizing a solenoid 80 which opens the fluid valve 52, starting the flow of liquid bitumen into the mixer 25 through the spray tube 40.

As the liquid flows through the valve 52 and the meter 50, the volume of the fluid passed is accurately measured by the meter and permitted to continue until a volume equal to the preselected volume has been delivered, at which time the switch actuating means of the meter mechanism operates to open the circuit to the solenoid 80 thus allowing spring means associated with the stem of the valve 52 to move the latter to closed position, as explained in detail in my prior Patents 2,116,777 and 2,116,778 above referred to. At the same time a circuit including a second timer device 85 is closed and at the expiration of a preselected wet mixing time period the timer 85 operates to close the circuit energizing the solenoid 64 in such manner as to actuate the valve 60 to direct steam flow into the cylinder 62 in such direction as to cause the gate 36 to open, whereupon the mixed material is discharged from the mixer 25 into the truck or other conveying device arranged therebelow. The control devices of the apparatus will at this time be returned to their initial conditions and ready for repeated operations of the mixing cycle as hereinabove described. It will be understood that the timer devices 76 and 85 will be adjusted to suit different conditions and mixing requirements in connection with the respective dry mixing and wet mixing operations.

Throughout the dry mixing and fluid introduction and wet mixing phases of the operation the actuation of the control devices therefor is entirely automatic and out of the hands of the attendant. However, a master switch is preferably provided in a convenient location for the use of the attendant if it is required at any time to halt the normal operation of the mixing and dumping cycle, as for example, in case an empty truck or other conveyance does not arrive into position below the mixer by the time that the discharge from the mixer will normally take place. The master switch is preferably of the stop-start variety, and consequently the attendant may cause the operation to be interrupted and resumed as required.

It will be seen that the apparatus of the invention provides means for delivering accurately measured quantities of the various ingredients into the mixing chamber. The solid granular ingredients are accurately weight-measured in proper proportions without difficulty because no variables occur for which adjustments cannot be readily made. The fluid ingredients are accurately volumetrically measured, thus avoiding difficulties otherwise associated with varying viscosity and/or specific gravity characteristics, or the like, in apparatus employing weight measuring devices. Consequently, the finished mixed product contains the ingredients thereof in the prescribed relative proportions.

As explained hereinabove, the delivery of fluid into the mixer 25 is provided under pressure through the spray tube 40 which is provided with minute jet openings 42 whereby the fluid is discharged into the mixer in finely sprayed form throughout the entire mass of the solid aggregates as it is being tumbled and stirred by the mixing blades 32. Consequently, a much more intimate mix of the fluid into the dry aggregate particles is obtained, and the resultant product is of improved homogenity.

The fluid conveying conduits and the spray bar 40 are preferably heated by means of steam jackets so as to render the fluid less viscous at the time of discharge through the jets 42. For this purpose, as illustrated in Fig. 4 in connection with the spray bar 40, an enveloping tube 43 is disposed about the fluid conduit 40 and in spaced relation therefrom to provide a passageway for steam therebetween; and conduit means (not shown) for introducing live steam into the passageway and for withdrawing condensate therefrom will be provided in any suitable manner. By reason of the heating of the fluid in this manner, as in the case of asphalt or other heavy bituminous fluid substances, the fluidity thereof will be of greatly increased order as it issues from the jets 42 in sprayed form and it will consequently more intimately mix with the finest granular ingredients.

By reason of the provision for automatic introduction of heated bituminous fluid into the mixer chamber the connection between the weigh box 15 and the casing of the mixer 25 may be completely closed by means of the skirt 27; and this provides an important safety feature with respect to the person attending the apparatus inasmuch as the danger of hot bitumen being splashed from the mixer upon the attendant is eliminated. Also, in connection with many asphalt composition mixing operations it is customary to employ special "liquifying" agents of high volatility and combustible characteristics; and inasmuch as the dry aggregate ingredients usually contain siliceous or flint-like objects combustion flashes sometimes occur in the mixing chamber to the danger of the attendant unless he is shielded therefrom as by the apron 27 of the present apparatus. However, in the case of bitumen batch weighing processes, it is impracticable to enclose the weighing devices and the opening to the mixer and at the same time permit convenient handling of the apparatus by the operator; and thus the system of the present invention permits a construction of further advantages and utility.

A recent important development in connection with asphalt paving composition preparation involves emulsification of the asphalt ingredient prior to its being mixed with the dry aggregate. An effective means for accomplishing such emulsification in combination with the other features of this invention may be provided in the form of a closed container in which a supply of heated asphalt is accumulated and subjected to churning and miscegenation by live steam issuing under pressure from a restricted jet. An arrangement for the purpose may be readily provided in combination with the apparatus previously described and illustrated in Fig. 1, and will comprise, as shown in Fig. 2, a closed container 100 disposed in the line of the asphalt conduit leading to the spray bar 40 and preferably between the meter 50 and the spray bar, so that the meter handles the asphalt when in its original form.

A steam inlet conduit 102 is connected into the container 100 and is arranged to be controlled by a valve 104. A pressure gauge 106 will be provided to indicate the pressure inside of the container. Asphalt inlet and outlet control valves 108 and 110 will be provided in the respective conduit connections; and thus flow of asphalt into and out of the container as well as flow of steam into the container may be readily controlled and regulated. In addition to providing emulsification of the asphalt prior to delivery into the mixer, the steam introduced through the conduit 102 will function to preheat the asphalt prior to delivery through the spray jets 42, thus providing for improved admixture of the composition ingredients and the preparation of an improved product.

A modified form of spray head for the bitumen inlet conduit is illustrated in Figs. 5, 6 and 7 wherein the fluid conduit 44 is shown as being enclosed in a larger conduit 45, thus providing a steam space therebetween. The bitumen conduit 44 is screwthreaded at its end into a flange 102 which is in turn bolted to the spray head by means of bolts 103. The outer tube 45 is butt welded at its end to the flange 102, thus making the steam space between the tubes fluid tight.

The spray head comprises essentially an upper casting 104 and a lower casting 105, and is hollowed as at 106 to provide a bitumen carrying space which is in open communication with the inlet conduit 44. The upper and lower castings are held together by means of bolts 107. The lower inner surface portion of the casting 105 is grooved as at 108 to provide a plane surface seat for a reciprocal multiple valve member 109. The valve 109 is in the form of a metallic bar or plate, and the lower side wall portions of the groove 108 are arranged to fit and guide the valve bar 109 during its reciprocal movements in directions parallel to its longitudinal axis.

The casting 105 is formed with a series of spaced small fluid outlet openings 110 extending therethrough and into open communication with the interior opening 106, and the valve bar 109 is provided with a series of corresponding openings therethrough adapted to register with the openings 110 at one position of the valve 109. In the present instance the openings in the valve bar 109 are shown as comprising vertical ports 112 corresponding to the casing openings 110, and transverse horizontally disposed ports 114 which extend through the valve bar from side to side and intersect with corresponding vertical ports 112. Thus, when the valve bar 109 is in valve-open position, the bitumen fluid in the conduit 44 is free to flow through the opening 106 longitudinally of the spray bar and through the multiple ports 114 and thence through the ports 112 and 110 which are disposed in registry with one another, and thus to be sprayed outwardly through the jet-like orifices of the ports 110 into the mixing chamber. When the valve bar 109 is shifted longitudinally from the position previously described, the ports 110 are covered by imperforate portions of the valve bar 109, and the flow of fluid is cut off.

Means for automatically actuating the valve bar to open and closed positions are shown as comprising a thrust arm 115 which is screw-threaded at one end into operative connection with the valve bar and extends through a packing gland portion 116 of the casting into operative connection with a pivoted lever arm 118 which in turn is coupled to the armature of a solenoid device 120. A coil spring 122 is also associated with the solenoid armature in such manner as to normally urge the latter outwardly and the valve bar 109 toward closed position. The solenoid 120 is so connected with the meter control device previously described that when the meter mechanism closes the circuit energizing the solenoid the valve bar 109 is motivated to its valve-open position as illustrated in Fig. 5, and when the circuit is deenergized the spring 122 returns the system to valve-closed position. Thus, the valve control device of Fig. 5 is a counterpart of the device of Fig. 1 that controls the operation of the valve 52 thereof.

Hence, the operation of the spray head of Figs. 5, 6 and 7 is accomplished by means of mechanism similar to that illustrated and described in connection with Fig. 1, but it will be understood that inasmuch as the valve member 109 is immediately adjacent the outlet jets 110 an improved operation results in that the cut-off of bitumen flow takes place immediately at the outlet jets instead of at a position remote therefrom. By reason of this arrangement measurement errors such as would otherwise be introduced into the operation of the fluid handling system are prevented.

In order to maintain the valve bar 109 in properly seated relation with respect to the lower casting 105, a series of adjustable thrust screws 125 are arranged in the upper casting 104 in such manner as to bear at their lower ends upon a guide plate 127 which in turn rests against the upper surface of the valve bar 109 in slide fitting relation. Consequently accidental leakage around and under the spray bar 109 and through the outlet ports 110 is avoided; and wearing of the valve parts may be compensated for.

To assist in maintaining the bitumen substances in condition of maximum fluidity the head castings 104 and 105 are provided with steam conduits 130 therethrough; said conduits being either in open communication with the steam space between the tubular conduits 44 and 45 or otherwise supplied with steam by means of separate steam inlet devices (not shown). Suitable condensate outlet means will also be preferably provided in connection with the steam conduits of the mechanism in any suitable manner.

Although only a limited number of forms of the invention have been shown and described in detail, it will be apparent to those skilled in the art that the invention is not so limited but that various changes may be made therein without departing from the spirit of the invention or the scope of the appended claims.

I claim:

1. In a mechanism for intimately mixing solid and fluid bituminous paving composition materials, the combination of a mixing chamber and a stirring device therein, means for actuating said stirring device, a bitumen fluid inlet device having a spraying type outlet for directing said fluid into said chamber, means for supplying fluid to said inlet device under pressure, valve means associated with said inlet device for controlling flow of fluid therethrough, and control means for said stirring device actuating means and said valve means so arranged as to operate automatically subsequent to disposition of the solid materials in said chamber to cause said stirring device to be actuated throughout a predetermined time period and then to cause a predetermined volume of bitumen fluid to pass through said spraying outlet into said chamber while said stirring device continues in operation, and then to cause said stirring device to continue in operation throughout a subsequent predetermined time period and then to cause the mixed product to be discharged from said chamber.

2. In a mechanism for intimately mixing solid and fluid bituminous paving composition materials, the combination of a mixing chamber and a stirring device therein, means for actuating said stirring device, a steam heated fluid inlet device having a spraying type outlet for directing said fluid into said chamber, means for supplying fluid to said inlet device under pressure, valve means associated with said inlet device for controlling flow of fluid therethrough, and control means for said stirring device actuating means and said valve means so arranged as to operate automatically subsequent to disposition of the solid materials in said chamber to cause said stirring device to be actuated throughout a predetermined time period and then to cause a predetermined volume of fluid to pass through said spraying outlet into said chamber while said stirring device continues in operation, and then to cause said stirring device to continue in operation throughout a subsequent predetermined time period and then to cause the mixed product to be discharged from said chamber.

3. In a mechanism for intimately mixing solid and fluid bituminous paving composition bitumen materials, the combination of a mixing chamber and a stirring device therein, means for actuating said stirring device, a fluid inlet conduit having a steam introducing connection of jet form adapted to discharge steam into said fluid inlet conduit to simultaneously heat and emulsify the fluid passing therein and having a spraying type outlet for directing said bitumen into said chamber, means for supplying fluid to said inlet conduit under pressure, valve means associated with said conduit for controlling flow of bitumen therethrough, and control means for said stirring device actuating means and said valve means so arranged as to operate automatically subsequent to disposition of the solid materials in said chamber to cause said stirring device to be actuated throughout a predetermined time period and then to cause a predetermined volume of bitumen to pass through said spraying outlet into said chamber while said stirring device continues in operation, and then to cause said stirring device to continue in operation throughout a subsequent predetermined time period and then to cause the mixed product to be discharged from said chamber.

4. In a mechanism for mixing bituminous paving compositions or the like, a mixing chamber and a stirring device therein, means for actuating said stirring device, a bitumen inlet conduit having a spraying type outlet port arranged to discharge into said mixing chamber, a control valve in said conduit adjacent said outlet port, a fluid meter of the positive displacement type in the line of said conduit, means for opening said control valve, means operatively associated with said meter for actuating said control valve to port closed position subsequent to flow of a predetermined volume of bituminous substance through said meter, and a bitumen emulsifying device including a steam inlet jet discharging into said conduit at a position between said meter and said conduit outlet port.

5. In a mechanism for mixing bituminous paving compositions or the like, a mixing chamber and a stirring device therein, means for actuating said stirring device, a bitumen inlet conduit having a spraying type outlet port arranged to discharge into said mixing chamber, a control valve operatively associated with said outlet port, a fluid meter of the positive displacement type in the line of said conduit, means for opening said control valve, and means operatively associated with said meter for actuating said control valve to port-closed position subsequent to flow of a predetermined volume of bitumen through said meter.

EDWARD HAROLD BRAYER.